(12) United States Patent
Lee et al.

(10) Patent No.: US 11,757,401 B2
(45) Date of Patent: Sep. 12, 2023

(54) SOLAR BOAT WITH ADJUSTABLE ANGLE OF SOLAR PANEL

(71) Applicant: K-MARINE CO., LTD., Jeollabuk-do (KR)

(72) Inventors: Chan Woo Lee, Jeollabuk-do (KR); Hye Sook Jung, Jeollabuk-do (KR); Yun Seo Cheon, Jeollabuk-do (KR)

(73) Assignee: K-MARINE CO., LTD.

( * ) Notice: Subject to any disclaimer, the term of this patent is extended or adjusted under 35 U.S.C. 154(b) by 0 days.

(21) Appl. No.: 17/880,728

(22) Filed: Aug. 4, 2022

(65) Prior Publication Data
US 2023/0208347 A1 Jun. 29, 2023

(30) Foreign Application Priority Data
Dec. 29, 2021 (KR) .......................... 10-2021-0190782

(51) Int. Cl.
*H02S 20/30* (2014.01)
*H02S 40/34* (2014.01)
*B63H 21/17* (2006.01)

(52) U.S. Cl.
CPC ............. *H02S 20/30* (2014.12); *B63H 21/17* (2013.01); *H02S 40/34* (2014.12); *B63H 2021/171* (2013.01)

(58) Field of Classification Search
CPC .......................... B63H 2021/171; H02S 30/20
See application file for complete search history.

(56) References Cited

U.S. PATENT DOCUMENTS

| | | | | |
|---|---|---|---|---|
| 2006/0191463 A1* | 8/2006 | Little | .................... | B63B 17/02 114/292 |
| 2013/0298958 A1* | 11/2013 | Kopylov | ........... | H01L 31/02013 136/244 |
| 2019/0144076 A1* | 5/2019 | Levin | .................... | B63B 35/34 114/345 |

FOREIGN PATENT DOCUMENTS

| | | |
|---|---|---|
| KR | 10-1373817 | 3/2014 |
| KR | 10-2016-0116883 A | * 10/2016 |

OTHER PUBLICATIONS

English machine translation of Lee (KR10-2016-0116883A) provided by the EPO website, all pages, 2022 (Year: 2022).*

* cited by examiner

Primary Examiner — Daniel P Malley, Jr.
(74) Attorney, Agent, or Firm — McDonald Hopkins LLC

(57) ABSTRACT

A solar boat with an adjustable angle of a solar panel of the present disclosure comprises: a cabin unit; a boat body provided below the cabin unit and including a first fixing unit and a second fixing unit; a solar panel unit provided above the cabin unit and configured to convert solar energy into electrical energy; a first pole provided with a first connector at an upper end thereof and connected to a front left bottom of the solar panel unit via the first connector, and provided with a second connector at a lower end thereof and connected to the boat body via the second connector; a second pole provided with a third connector at an upper end thereof and connected to a front right bottom of the solar panel unit via the third connector, and provided with a fourth connector at a lower portion thereof and connected to the boat body via the fourth connector; a third pole provided with a fifth connector at an upper end thereof and connected to a rear left bottom of the solar panel unit via the fifth connector, provided with a sixth connector at a lower portion thereof and connected to the boat body via the sixth connector, and provided with a seventh connector below the sixth connector and connected to an upper end of a first adjustment unit via the seventh connector; a fourth pole provided with an eighth connector at an upper end thereof and connected to a rear right bottom of the solar panel unit via the eighth connector, provided with a ninth connector at a lower portion thereof and connected to the boat body via the ninth connector, and provided with a tenth connector below the ninth connector and connected to an upper end of a second adjustment unit via the tenth connector; the first adjustment unit connected to the seventh connector at an upper end thereof, provided with an eleventh connector at a lower end thereof and connected to the first fixing unit via the eleventh connector, and being adjustable in its length; and the second adjustment unit connected to the tenth (Continued)

connector at an upper end thereof, provided with a twelfth connector at a lower end thereof and connected to the second fixing unit via the twelfth connector, and being adjustable in its length, and has the effects that can perform efficient solar power generation according to the surrounding environment or the direction of sunlight by enabling the angle adjustment of the solar panels installed on the roof of the solar boat, and that can reduce the volume of the solar boat when anchored, and can resolve the problem of taking up a lot of space by the fixed solar panels when anchored by enabling the angle adjustment of the solar panels installed on the roof of the solar boat and the storage thereof into the boat body.

7 Claims, 4 Drawing Sheets

SOLAR BOAT WITH ADJUSTABLE ANGLE OF SOLAR PANEL

FIELD OF THE DISCLOSURE

The present disclosure relates to a solar boat with an adjustable angle of a solar panel, and more particularly, to a solar boat that can enhance the efficiency of solar power generation through solar panels via angle adjustments during operation, can facilitate the anchoring of the solar boat even in a narrow space via the angle adjustments during anchoring, and can adjust the angle of the solar panels with a small force by making it possible to adjust the angle of the solar panels in the solar boat operated by converting solar energy into electrical energy.

BACKGROUND

Currently, for fossil fuels such as coal, petroleum, or the like required for energy production, carbon dioxide emitted by their use has been the main cause of global warming, and in addition, carbon monoxide, nitrogen oxides, sulfur oxides, etc., emitted from the combustion of fossil fuels have become the causes of damaging human health or resulting in acid rain that destroys forests. Furthermore, fossil fuels have limitations in their reserves, and there is also a more fundamental problem that they could soon be depleted due to their indiscriminate use by humankind.

In order to solve these problems, there is a need for the development of new technologies to reduce the risk of global warming by reducing the consumption of fossil fuels and to use natural energy that can replace fossil fuels. Natural energy alternatives to replace fossil fuels include solar power generation, wind power generation, hydroelectric power generation, etc. In particular, power generation using sunlight has received attention as it reduces greenhouse gases significantly and is superior to other natural energies in terms of energy efficiency.

In general, power generation using sunlight is a power generation method that directly converts light energy generated from the sun into electrical energy, and has the advantage of being able to generate electricity in a needed amount by installing necessary facilities where it is needed as sunlight, which is an energy source, exists everywhere on the earth and thus, there are no restrictions on the location.

Further, power generation using sunlight has advantages that it can be easily installed in various places as the period of building or constructing facilities is short, and can respond quickly to temporary increases in demand, maintenance of the facilities using sunlight is easy, and the consumption of human resources can be minimized.

Such solar power generation can be integrated into various fields, and recently, even a solar boat too has emerged that performs solar power generation by using solar panels and that moves on water using it as power. A solar boat is a boat designed to supply electricity to the solar boat with the electric power produced from sunlight using the solar panels installed on the roof of the boat or to use it later by storing the excess in a storage battery. Solar boats have the advantage of being environmentally friendly and not causing marine pollution as they do not emit pollutants.

However, for solar boats, there are a problem that efficient solar power generation is not achieved depending on the surrounding environment or the direction of sunlight as the solar panels installed on the roof of the boat are fixed, and a problem of taking up a lot of space by the bulky and fixed solar panels when anchored. Furthermore, when moving a solar boat on the ground for leisure activities, there were problems in that it was difficult to move because of the bulky and fixed solar panels and that there was a risk of the occurrence of accidents while moving.

Accordingly, the present inventor has invented a solar boat that can enhance the efficiency of solar power generation through solar panels via angle adjustments during operation, can facilitate the anchoring of the solar boat even in a narrow space via the angle adjustments during anchoring, and can adjust the angle of the solar panels with a small force.

In this regard, Korean Patent No. 10-1373817 (Patent Document 1) has been disclosed as prior art related to solar boats.

Patent Document 1 relates to a motor-driven water leisure boat using sunlight comprising a body 10 having a chair 11 formed therein and configured to float on a water surface, a propeller 20 configured to provide a propulsive force of the body 10, a rudder 30 consisting of a direction change shaft 31 and a direction change blade 32 for controlling the traveling direction at the rear bottom of the body 10, a solar power generation unit 100 consisting of a number of supports 110 installed vertically on the body 10, a both-side inclined roof 120 installed at the top of the supports 110, a solar 130 module installed on the upper surface of the roof 120, and a storage battery 140 installed in the body 10, a drive motor 200 connected to the propeller 20 in the body 10 on the one hand and configured to apply the rotational force of the propeller 20 by using the electricity stored in the storage battery 140, an operation lever 300 consisting of a handle 310 for operating the traveling of the body 10 and a rotation shaft 320 for controlling the direction of the rudder 30, a pair of wires 400, 400' each of which has one end connected to the rotation shaft 320 and the other end connected to the rudder 30, and a control unit 500 configured to control the driving of the drive motor 200, wherein the handle 310 is provided with a switching unit 311 consisting of a number of switches for operating the traveling of the body 10, the rotation shaft 320 is rotatably installed on a rotation shaft holder 330 at the lower end of which a front guide piece 331 having a pair of first branch holes 331a and 331a' on one side is formed to protrude, a pair of corresponding rotation shaft connectors 320a and 320a' are formed to protrude from both sides of the lower portion of the rotation shaft 320, the rotation shaft holder 330 is finished with a rotation shaft housing 340 through which the wires 400 and 400' are drawn out and the rotation shaft 320 passes through, and one end of the wires 400 and 400' is configured to be connected to the rotation shaft connector 320a and 320a', respectively, through the rotation shaft housing 340 and the first branch holes 331a and 331a' of the front guide piece 331.

However, the prior art related to the conventional solar boat including Patent Document 1 still has a problem that efficient solar power generation is not achieved as the solar panels installed on the roof of the boat are fixed, a problem of taking up a lot of space by the bulky and fixed solar panels, and so on.

Prior Art Literature

Patent Documents (Patent Document 1) Registered Korean Patent No. 10-1373817 (Date: Mar. 11, 2014)

SUMMARY OF THE DISCLOSURE

Technical Objects

In resolving the problems described above, it is an object of the present disclosure to provide a solar boat with an adjustable angle of a solar panel that can perform efficient solar power generation according to the surrounding environment or the direction of sunlight by enabling the angle adjustment of the solar panels installed on the roof of the solar boat.

Further, it is another object of the present disclosure to provide a solar boat with an adjustable angle of a solar panel that can reduce the volume of the solar boat when anchored, and can resolve the problem of taking up a lot of space by the fixed solar panels when anchored by enabling the angle adjustment of the solar panels installed on the roof of the solar boat and the storage thereof into the boat body.

Moreover, it is still another object of the present disclosure to provide a solar boat with an adjustable angle of a solar panel that can reduce the risk of accidents that may occur when moving the solar boat on the ground for leisure activities and can resolve the difficulties when moving on the ground that may result in due to the bulky and fixed solar panels by enabling the angle adjustment of the solar panels installed on the roof and the storage thereof into the boat body.

Furthermore, it is yet another object of the present disclosure to provide a solar boat with an adjustable angle of a solar panel with excellent efficiency by enabling the angle adjustment of the solar panels installed on the roof by using a simple structure and a small force.

Technical Solution

A solar boat with an adjustable angle of a solar panel in accordance with an embodiment of the present disclosure comprises: a cabin unit; a boat body provided below the cabin unit and including a first fixing unit and a second fixing unit; a solar panel unit provided above the cabin unit and configured to convert solar energy into electrical energy; a first pole provided with a first connector at an upper end thereof and connected to a front left bottom of the solar panel unit via the first connector, and provided with a second connector at a lower end thereof and connected to the boat body via the second connector; a second pole provided with a third connector at an upper end thereof and connected to a front right bottom of the solar panel unit via the third connector, and provided with a fourth connector at a lower portion thereof and connected to the boat body via the fourth connector; a third pole provided with a fifth connector at an upper end thereof and connected to a rear left bottom of the solar panel unit via the fifth connector, provided with a sixth connector at a lower portion thereof and connected to the boat body via the sixth connector, and provided with a seventh connector below the sixth connector and connected to an upper end of a first adjustment unit via the seventh connector; a fourth pole provided with an eighth connector at an upper end thereof and connected to a rear right bottom of the solar panel unit via the eighth connector, provided with a ninth connector at a lower portion thereof and connected to the boat body via the ninth connector, and provided with a tenth connector below the ninth connector and connected to an upper end of a second adjustment unit via the tenth connector; the first adjustment unit connected to the seventh connector at an upper end thereof, provided with an eleventh connector at a lower end thereof and connected to the first fixing unit via the eleventh connector, and being adjustable in its length; and the second adjustment unit connected to the tenth connector at an upper end thereof, provided with a twelfth connector at a lower end thereof and connected to the second fixing unit via the twelfth connector, and being adjustable in its length.

In this case, the solar boat with an adjustable angle of a solar panel in accordance with an embodiment of the present disclosure may further comprise a first elastic member connecting a lower end of the third pole and the first fixing unit, and a second elastic member connecting a lower end of the fourth pole and the second fixing unit, so that when an angle between the third pole and fourth pole and the horizontal plane decreases, an elastic force acts while the first elastic member and the second elastic member extend, to thereby perform a function of mitigating the speed of decrease in the angle between the third pole and fourth pole and the horizontal plane.

Further, in the solar boat with an adjustable angle of a solar panel in accordance with an embodiment of the present disclosure, the first adjustment unit and the second adjustment unit may be configured with electric cylinders, so that when an angle between the third pole and fourth pole and the horizontal plane decreases, an attractive force by the electric cylinders acts while the first adjustment unit and the second adjustment unit extend, to thereby perform a function of mitigating the speed of decrease in the angle between the third pole and fourth pole and the horizontal plane.

In this case, in the solar boat with an adjustable angle of a solar panel in accordance with an embodiment of the present disclosure, the boat body may further comprise a first pole storage, a second pole storage, a third pole storage, and a fourth pole storage for storing the first pole, the second pole, the third pole, and the fourth pole.

Moreover, in the solar boat with an adjustable angle of a solar panel in accordance with an embodiment of the present disclosure, the first pole storage, the second pole storage, the third pole storage, and the fourth pole storage may further comprise a first buffer member, a second buffer member, a third buffer member, and a fourth buffer member that can mitigate an impact caused at the time of storing the first pole, the second pole, the third pole, and the fourth pole.

In this case, in the solar boat with an adjustable angle of a solar panel in accordance with an embodiment of the present disclosure, the first pole, the second pole, the third pole, and the fourth pole may be configured with electric cylinders, thereby enabling height adjustment of the solar panel unit.

In addition, the solar boat with an adjustable angle of a solar panel in accordance with an embodiment of the present disclosure may further comprise an object detection sensor configured to generate a warning when an object is detected under the solar panel unit so as to prevent accidents that may occur when adjusting the angle of the solar panel.

Effects of the Disclosure

As described above, the solar boat with an adjustable angle of a solar panel in accordance with one embodiment of the present disclosure has the effect that can perform efficient solar power generation according to the surrounding environment or the direction of sunlight by enabling the angle adjustment of the solar panels installed on the roof of the solar boat.

Further, the solar boat with an adjustable angle of a solar panel in accordance with one embodiment of the present disclosure has the effect that can reduce the volume of the solar boat when anchored, and can resolve the problem of taking up a lot of space by the fixed solar panels when anchored by enabling the angle adjustment of the solar panels installed on the roof of the solar boat and the storage thereof into the boat body.

In addition, the solar boat with an adjustable angle of a solar panel in accordance with one embodiment of the present disclosure has the effect that can reduce the risk of accidents that may occur when moving the solar boat on the ground for leisure activities and can resolve the difficulties when moving on the ground that may result in due to the bulky and fixed solar panels by enabling the angle adjustment of the solar panels installed on the roof and the storage thereof into the boat body.

Moreover, the solar boat with an adjustable angle of a solar panel in accordance with one embodiment of the present disclosure has the effect of excellent efficiency by enabling the angle adjustment of the solar panels installed on the roof by using a simple structure and a small force.

DETAILED DESCRIPTION OF THE PREFERRED EMBODIMENTS

In the present disclosure, the accompanying drawings may be illustrated in an exaggerated representation for the convenience of understanding the technology, as well as for differentiation and clarity from the prior art. In addition, since the terms to be described below are terms defined in consideration of the functions in the present disclosure and may vary depending on the intention of a user or operator or custom, definitions of these terms should be made based on the technical contents throughout this specification. On the other hand, the embodiments are merely illustrative matters of the components presented in the claims of the present disclosure and do not limit the scope of the present disclosure, and the scope of rights should be construed based on the technical idea throughout the specification of the present disclosure.

Further, before describing the present disclosure, it should be noted that matters that are not necessary to disclose the subject matter of the present disclosure, i.e., known configurations that can be added unambiguously by those of ordinary skill in the art, are not shown or specifically described.

Figure 1:
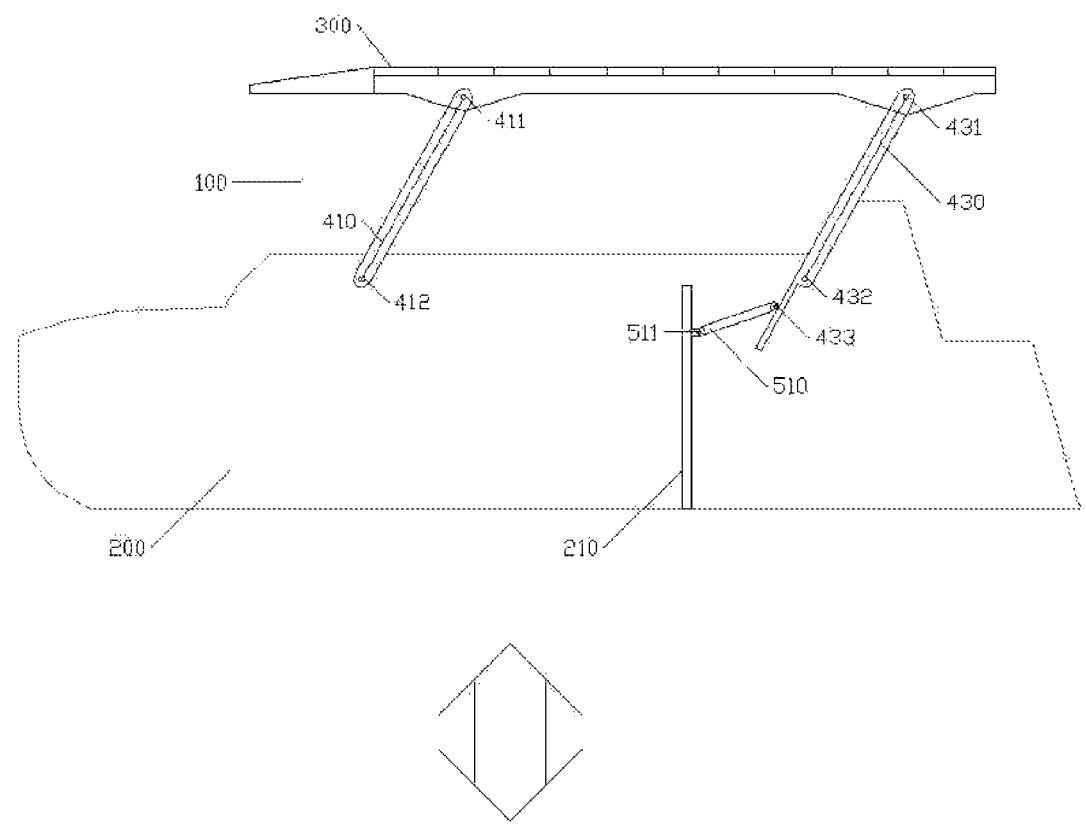
FIG. 1 is a view showing the configuration of a solar boat with an adjustable angle of a solar panel that is one embodiment of the present disclosure, and the figure before and after the completion of folding solar panels.
Figure 1:
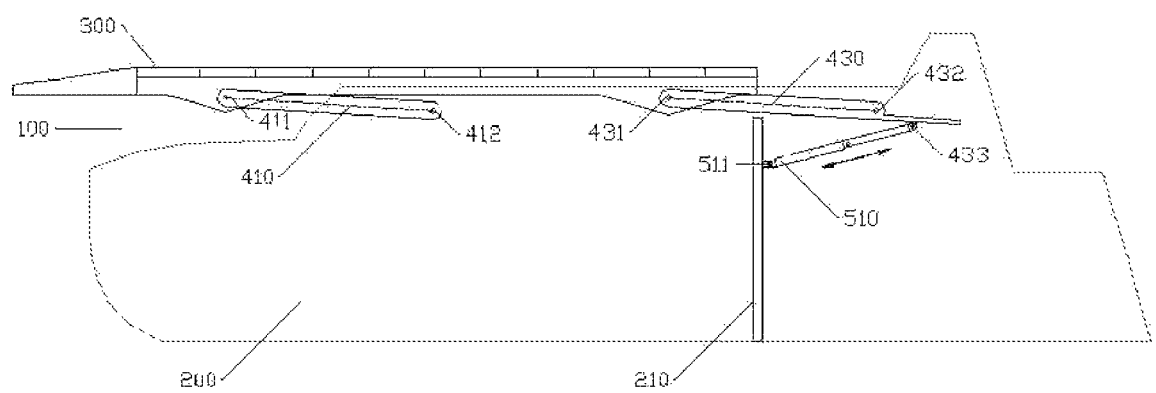

FIG. 1 is a view showing the configuration of a solar boat with an adjustable angle of a solar panel that is one embodiment of the present disclosure, and the figure before and after the completion of folding solar panels.

According to FIG. 1, a solar boat with an adjustable angle of a solar panel in accordance with one embodiment of the present disclosure comprises a cabin unit 100, a boat body 200 provided below the cabin unit 100 and including a first fixing unit 210 and a second fixing unit 220, a solar panel unit 300 provided above the cabin unit 100 and configured to convert solar energy into electrical energy, a first pole 410 provided with a first connector 411 at an upper end thereof and connected to a front left bottom of the solar panel unit 300 via the first connector 411, and provided with a second connector 412 at a lower end thereof and connected to the boat body 200 via the second connector 412, a second pole 420 provided with a third connector 421 at an upper end thereof and connected to a front right bottom of the solar panel unit 300 via the third connector 421, and provided with a fourth connector 422 at a lower portion thereof and connected to the boat body 200 via the fourth connector 422, a third pole 430 provided with a fifth connector 431 at an upper end thereof and connected to a rear left bottom of the solar panel unit 300 via the fifth connector 431, provided with a sixth connector 432 at a lower portion thereof and connected to the boat body 200 via the sixth connector 432, and provided with a seventh connector 433 below the sixth connector 432 and connected to an upper end of a first adjustment unit 510 via the seventh connector 433, a fourth pole 440 provided with an eighth connector 441 at an upper end thereof and connected to a rear right bottom of the solar panel unit 300 via the eighth connector 441, provided with a ninth connector 442 at a lower portion thereof and connected to the boat body 200 via the ninth connector 442, and provided with a tenth connector 443 below the ninth connector 442 and connected to an upper end of a second adjustment unit 520 via the tenth connector 443, the first adjustment unit 510 connected to the seventh connector 433 at an upper end thereof, provided with an eleventh connector 511 at a lower end thereof and connected to the first fixing unit 210 via the eleventh connector 511, and being adjustable in its length, and the second adjustment unit 520 connected to the tenth connector 443 at an upper end thereof, provided with a twelfth connector 521 at a lower end thereof and connected to the second fixing unit 220 via the twelfth connector 521, and being adjustable in its length.

The cabin unit 100 may include a driver's seat (not shown) and a cabin (not shown) in which passengers board. The boat body 200 including the first fixing unit 210 and the second fixing unit 220 may be provided below the cabin unit 100, and in some cases, the boat body 200 may be provided symmetrically left and right, and may comprise a pair of ship bottoms provided apart from each other with respect to the central part, or may comprise a single ship bottom as well. The first fixing unit 210 and the second fixing unit 220 may be included symmetrically left and right inside the boat body 200. The first adjustment unit 510 may be connected to the first fixing unit 210 via the eleventh connector 511, and the second adjustment unit 520 may be connected to the second fixing unit 220 via the twelfth connector 521. As the first adjustment unit 510 is connected to the first fixing unit 210 via the eleventh connector 511 and the second adjustment unit 520 is connected to the second fixing unit 220 via the twelfth connector 521, the first adjustment unit 510 and the second adjustment unit 520 can perform a rotational movement around the eleventh connector 511 and the twelfth connector 521 relative to the first fixing unit 210 and the second fixing unit 220. As long as the function of connecting the first adjustment unit 510 via the eleventh connector 511 and connecting the second adjustment unit 520 via the twelfth connector 521 is performed, there are no particular restrictions on the structure or configuration of the first fixing unit 210 and the second fixing unit 220. The solar panel unit 300 is provided above the cabin unit 100 and performs the function of converting solar energy into electrical energy. The electricity produced by the solar panel unit 300 is stored in a battery unit (not shown) included in the boat body 200, and the electricity stored in the battery unit may operate a drive unit (not shown), and may operate the first adjustment unit 510, the second adjustment unit 520, the first pole 410, the second pole 420, the third pole 430, and the fourth pole 440, which are configured with electric cylinders to be described below. As the electricity stored in the battery unit drives the first adjustment unit 510 and the second adjustment unit 520 configured with electric cylinders, when the solar panel 300 is folded and thus, the third pole 430 and the fourth pole 440 rotate forward to reduce the angle with the horizontal plane, an attractive force by the electric cylinders acts while the first adjustment unit 510 and the second adjustment unit 520 extend, and reduces the speed of decrease in the angle between the third pole 430 and fourth pole 440 and the horizontal plane, thereby providing the feature that the angle of the solar panel 300 can be adjusted stably. As the electricity stored in the battery unit drives the first pole 410, the second pole 420, the third pole 430, and the fourth pole 440, which are configured with electric cylinders, it is possible to adjust the height by moving the solar panel 300 up and down, and it has a feature that the height of the solar panel 300 can be adjusted stably according to operating conditions. Since the first pole 410 and the second pole 420 have a symmetrical structure, the description of the first pole 410 will be substituted for the description of the second pole 420 in the following. The first pole 410 is provided with the first connector 411 at the upper end thereof, the first pole 410 is connected to the front left bottom of the solar panel unit 300 via the first connector 411, and the first pole 410 may perform a rotational movement around the first connector 411 relative to the solar panel 300. The first pole 410 is provided with the second connector 412 at the lower end thereof, the first pole 410 is connected to the boat body 200 via the second connector 412, and the first pole 410 may perform a rotational movement around the second connector 412 relative to the boat body 200. In addition, since the third pole 430 and the fourth pole 440 have a symmetrical structure, the description of the third pole 430 will be substituted for the description of the fourth pole 440 in the following. The third pole 430 is provided with the fifth connector 431 at the upper end thereof, the third pole 430 is connected to the rear left bottom of the solar panel unit 300 via the fifth connector 431, and the third pole 430 may perform a rotational movement around the fifth connector 431 relative to the solar panel 300. The third pole 430 is provided with the sixth connector 432 at the lower portion thereof, the third pole 430 is connected to the boat body 200 via the sixth connector 432, and the third pole 430 may perform a rotational movement around the sixth connector 432 relative to the boat body 200. In addition, the third pole 430 is provided with the seventh connector 433 below the sixth connector 432, the third pole 430 is connected to the upper end of the first adjustment unit 510 via the seventh connector 433, and the third pole 430 may perform a rotational movement around the seventh connector 433 relative to the first adjustment unit 510. Furthermore, since the first adjustment unit 510 and the second adjustment unit 520 have a symmetrical structure, the description of the first adjustment unit 510 will be substituted for the description of the second adjustment unit 520 in the following. The first adjustment unit 510 is connected to the seventh connector 433 at the upper end thereof, the first adjustment unit 510 is connected to the third pole 430 via the seventh connector 433, and the first adjustment unit 510 may perform a rotational movement around the seventh connector 433 relative to the third pole 430. The first adjustment unit 510 is provided with the eleventh connector 511 at the lower end thereof, the first adjustment unit 510 is connected to the first fixing unit 210 via the eleventh connector 511, and the first adjustment unit 510 may perform a rotational movement around the eleventh connector 511 relative to the first fixing unit 210. The length of the first adjustment unit 510 may be adjusted in the process that the first adjustment unit 510 performs a rotational movement around the seventh connector 433 relative to the third pole 430 and a rotational movement around the eleventh connector 511 relative to the first fixing unit 210. In the process that the first adjustment unit 510 performs a rotational movement around the seventh connector 433 relative to the third pole 430, the length of the first adjustment unit 510 may be shortened if the angle formed by the first adjustment unit 510 and the third pole 430 increases, and the length of the first adjustment unit 510 may be lengthened if the angle formed by the first adjustment unit 510 and the third pole 430 decreases.

Figure 2:
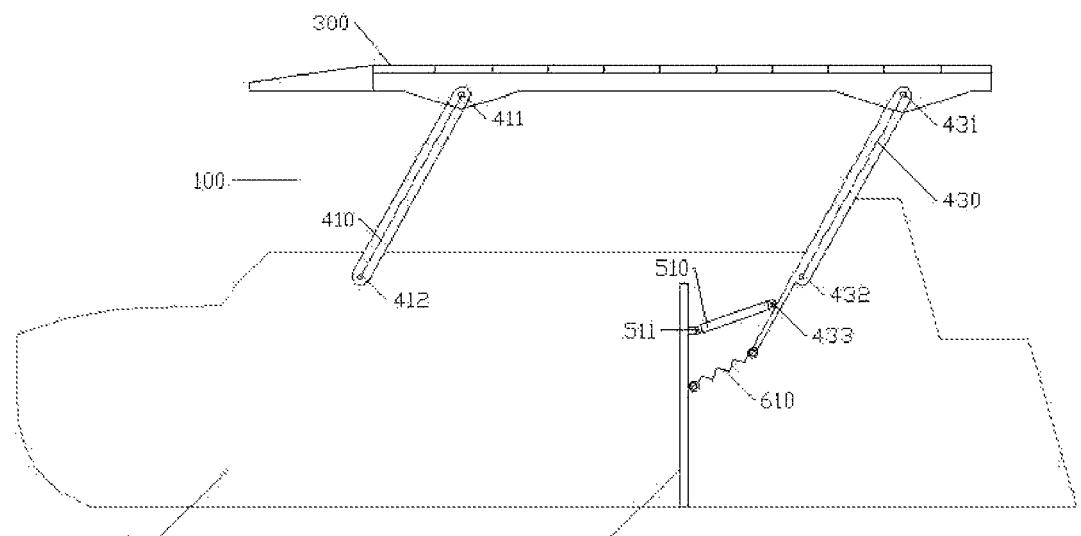
FIG. 2 is a view showing the figure in which elastic members are further included and adjustment units are configured with electric cylinders, thereby performing a function of reducing the speed of decrease in the angle between poles and the horizontal plane in a solar boat with an adjustable angle of a solar panel that is one embodiment of the present disclosure.
Figure 2:
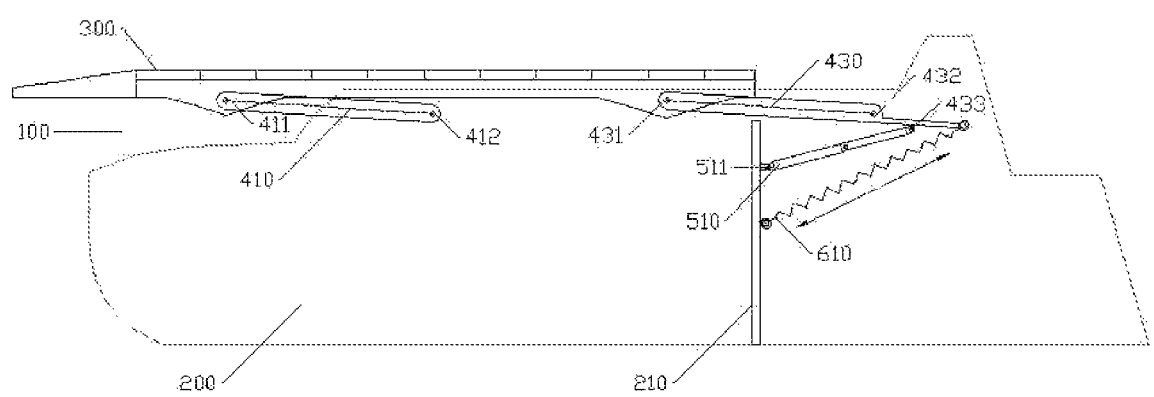

FIG. 2 is a view showing the figure in which elastic members are further included and adjustment units are configured with electric cylinders, thereby performing a function of reducing the speed of decrease in the angle between poles and the horizontal plane in a solar boat with an adjustable angle of a solar panel that is one embodiment of the present disclosure.

According to FIG. 2, the solar boat with an adjustable angle of a solar panel in accordance with one embodiment of the present disclosure may further include a first elastic member 610 connecting a lower end of the third pole 430 and the first fixing unit 210, and a second elastic member 620 connecting a lower end of the fourth pole 440 and the second fixing unit 220, or the first adjustment unit 510 and the second adjustment unit 520 may be configured with electric cylinders, so that when the angle between the third pole 430 and fourth pole 440 and the horizontal plane decreases, an elastic force may act while the first elastic member 610 and the second elastic member 620 extend, or an attractive force by the electric cylinders may act while the first adjustment unit 510 and the second adjustment unit 520 extend, thereby performing the function of mitigating the speed of decrease in the angle between the third pole 430 and fourth pole 440 and the horizontal plane.

In the solar boat with an adjustable angle of a solar panel of the present disclosure, since the first elastic member 610 and the second elastic member 620 have the same material and a symmetrical structure, the description of the first elastic member 610 will be substituted for the description of the second elastic member 620 in the following. The first elastic member 610 in the solar boat with an adjustable angle of a solar panel of the present disclosure refers to any means for providing an elastic force. In general, it may have a structure of a spring, but the first elastic member 610 is not limited thereto in the solar boat with an adjustable angle of a solar panel of the present disclosure. One end of the first elastic member 610 may be connected to the lower end of the third pole 430, and the other end of the first elastic member 610 may be connected to the first fixing unit 210. When the angle between the third pole 430 and the horizontal plane decreases, i.e., when the distance between the first fixing unit 210 and the lower end of the third pole 430 increases, an elastic force may act while the first elastic member 610 extends, to thereby mitigate the speed of decrease in the angle between the third pole 430 and the horizontal plane, and reduce the speed at which the first fixing unit 210 moves away from the lower end of the third pole 430.

In the solar boat with an adjustable angle of a solar panel of the present disclosure, since the first adjustment unit 510 and the second adjustment unit 520 have the same material and a symmetrical structure, the description of the first adjustment unit 510 will be substituted for the description of the second adjustment unit 520 in the following. The first adjustment unit 510 may be configured with an electric cylinder, and when the angle between the third pole 430 and the horizontal plane decreases, i.e., when the distance between the first fixing unit 210 and the lower end of the third pole 430 increases, an attractive force by the electric cylinder may act while the first adjustment unit 510 configured with an electric cylinder extends, to thereby mitigate the speed of decrease in the angle between the third pole 430 and the horizontal plane, and reduce the speed at which the first fixing unit 210 moves away from the lower end of the third pole 430. In this case, the first adjustment unit 510 configured with an electric cylinder may be operated by the battery unit (not shown) included in the boat body 200 in which the electricity produced by the solar panel unit 300 is stored.

Figure 3:
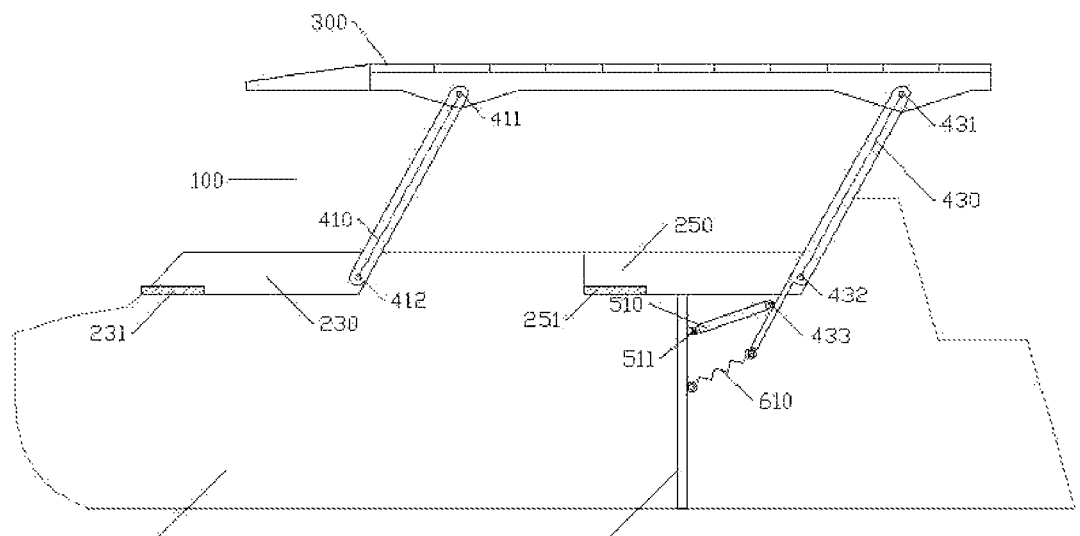
FIG. 3 is a view showing the figure in which pole storages and buffer members are further included, the poles are stored, and the impact caused at the time of storing is mitigated in a solar boat with an adjustable angle of a solar panel that is one embodiment of the present disclosure.
Figure 3:
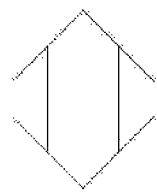
Figure 3:
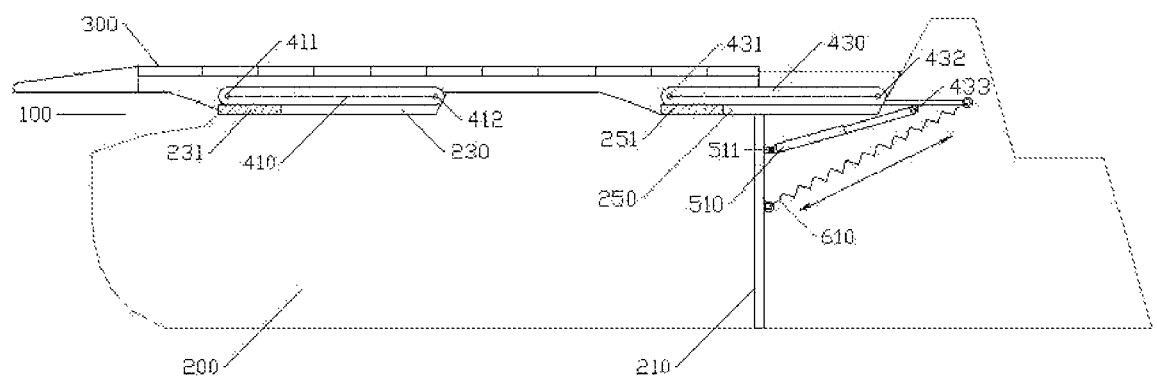

FIG. 3 is a view showing the figure in which pole storages and buffer members are further included, the poles are stored, and the impact caused at the time of storing is mitigated in a solar boat with an adjustable angle of a solar panel that is one embodiment of the present disclosure.

According to FIG. 3, in the solar boat with an adjustable angle of a solar panel in accordance with one embodiment of the present disclosure, the boat body 200 may further include a first pole storage 230, a second pole storage 240, a third pole storage 250, and a fourth pole storage 260 for storing the first pole 410, the second pole 420, the third pole 430, and the fourth pole 440, and the first pole storage 230, the second pole storage 240, the third pole storage 250, and the fourth pole storage 260 may further include a first buffer member 231, a second buffer member 241, a third buffer member 251, and a fourth buffer member 261, to thereby allow the first pole 410, the second pole 420, the third pole 430, and the fourth pole 440 to be stored, and perform the function to mitigate the impact caused at the time of storing.

In the solar boat with an adjustable angle of a solar panel of the present disclosure, the boat body 200 may further include the first pole storage 230, the second pole storage 240, the third pole storage 250, and the fourth pole storage 260 into which the first pole 410, the second pole 420, the third pole 430, and the fourth pole 440 can be stored, so that when the first pole 410, the second pole 420, the third pole 430, and the fourth pole 440 perform a rotational movement relative to the boat body 200 and the solar panel 300 is completely folded, the first pole 410, the second pole 420, the third pole 430, and the fourth pole 440 are not allowed to protrude to the outside, and the first pole 410, the second pole 420, the third pole 430, and the fourth pole 440 are parallel to the horizontal plane and thus the solar panel 300 can be completely folded. By having the first pole 410, the second pole 420, the third pole 430, and the fourth pole stored into the first pole storage 230, the second pole storage 240, the third pole storage 250, and the fourth pole storage 260, the solar panel 300 can be completely folded, so that the first pole 410, the second pole 420, the third pole 430, and the fourth pole 440 do not protrude to the outside, and the first pole 410, the second pole 420, the third pole 430, and the fourth pole 440 can be parallel to the horizontal plane.

Further, in the solar boat with an adjustable angle of a solar panel of the present disclosure, since impact may be caused when the first pole 410, the second pole 420, the third pole 430, and the fourth pole 440 are stored in the first pole storage 230, the second pole storage 240, the third pole storage 250, and the fourth pole storage 260, the first pole storage 230, the second pole storage 240, the third pole storage 250, and the fourth pole storage 260 may further include the first buffer member 231, the second buffer member 241, the third buffer member 251, and the fourth buffer member 261 that can alleviate the impact caused at the time of storing them, so as to be able to mitigate the impact. In this case, as long as the function of alleviating the impact caused when the first pole 410, the second pole 420, the third pole 430, and the fourth pole 440 are stored in the first pole storage 230, the second pole storage 240, the third pole storage 250, and the fourth pole storage 260 is performed, there are no particular restrictions on the types and materials of the first buffer member 231, the second buffer member 241, the third buffer member 251, and the fourth buffer member 261. However, it is generally preferable to have a rubber material.

Figure 4:
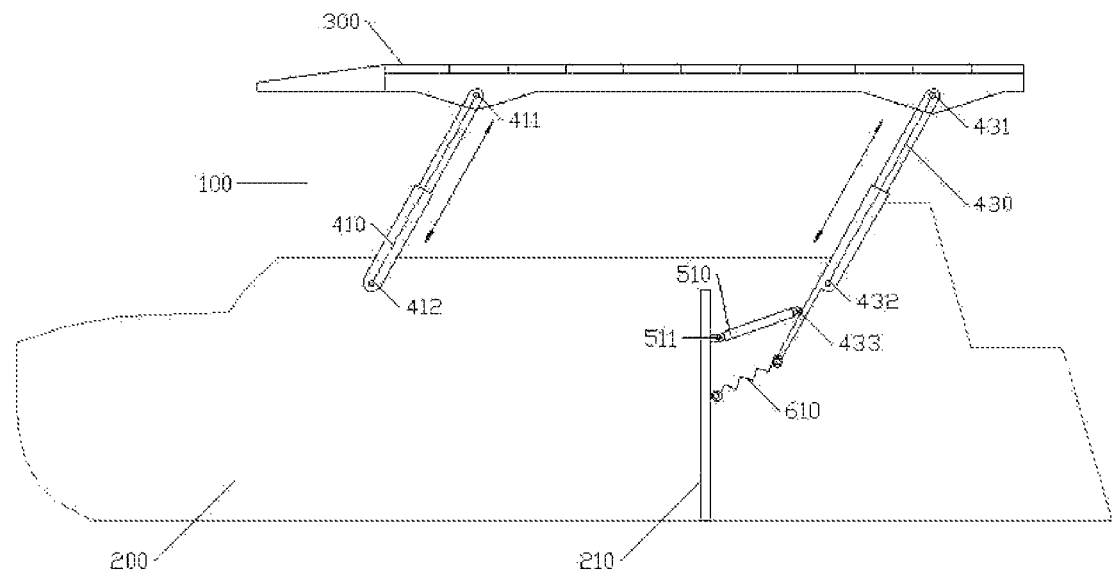
FIG. 4 is a view showing the figure in which poles are configured with electric cylinders and thus the height of a solar panel unit can be adjusted in a solar boat with an adjustable angle of a solar panel that is one embodiment of the present disclosure.

FIG. 4 is a view showing the figure in which poles are configured with electric cylinders and thus the height of a solar panel unit can be adjusted in a solar boat with an adjustable angle of a solar panel that is one embodiment of the present disclosure.

According to FIG. 4, in the solar boat with an adjustable angle of a solar panel in accordance with one embodiment of the present disclosure, the first pole 410, the second pole 420, the third pole 430, and the fourth pole 440 may be configured with electric cylinders, and by having the first pole 410, the second pole 420, the third pole 430, and the fourth pole 440 configured with electric cylinders, there may be provided a feature of enabling height adjustment in a uniform or non-uniform manner at the front and rear, left and right of the solar panel unit 300.

In this case, the first pole 410, the second pole 420, the third pole 430, and the fourth pole 440 configured with electric cylinders may be operated by the battery unit (not shown) included in the boat body 200 in which the electricity produced by the solar panel unit 300 is stored. In the solar boat with an adjustable angle of a solar panel of the present disclosure, the first pole 410, the second pole 420, the third pole 430, and the fourth pole 440 may operate simultaneously or independently of each other. For example, the entirety of the first pole 410, the second pole 420, the third pole 430, and the fourth pole 440 configured with electric cylinders may be lengthened if it is necessary to increase the overall height of the solar panel 300, and the entirety of the first pole 410, the second pole 420, the third pole 430, and the fourth pole 440 configured with electric cylinders may be shortened if it is necessary to lower the overall height of the solar panel 300. Furthermore, if it is necessary to raise only the front part of the solar panel 300, the lengths of the first pole 410 and the second pole 420 configured with electric cylinders may be increased, and the lengths of the third pole 430 and the fourth pole 440 may be shortened. In some cases, if it is necessary to raise only the right rear of the solar panel 300, the length of the fourth pole 440 configured with an electric cylinder may be increased, and the lengths of the first pole 410, the second pole 420, and the third pole 430 configured with electric cylinders may be shortened.

Figure 5:
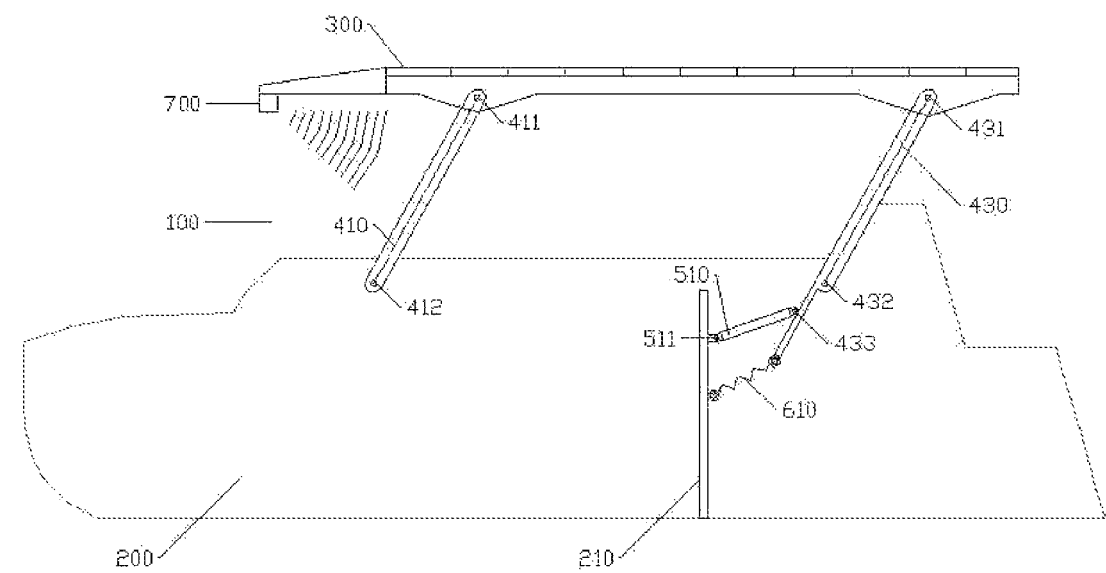
FIG. 5 is a view showing the figure in which an object detection sensor is further included to thereby generate a warning when an object is detected under the solar panel unit and can prevent accidents that may occur when adjusting the angle of the solar panel, in a solar boat with an adjustable angle of a solar panel that is one embodiment of the present disclosure.

FIG. 5 is a view showing the figure in which an object detection sensor is further included to thereby generate a warning when an object is detected under the solar panel unit and can prevent accidents that may occur when adjusting the angle of the solar panel, in a solar boat with an adjustable angle of a solar panel that is one embodiment of the present disclosure.

According to FIG. 5, the solar boat with an adjustable angle of a solar panel in accordance with one embodiment of the present disclosure may further include an object detection sensor 700 configured to generate a warning when an object is detected under the solar panel unit 300 so as to prevent accidents that may occur when adjusting the angle of the solar panel 300. In the solar boat with an adjustable angle of a solar panel in accordance with one embodiment of the present disclosure, the object detection sensor 700 is not particularly limited in its structure or configuration as long as it performs the function of detecting an object under the solar panel unit 300 and generating a warning. In the solar boat with an adjustable angle of a solar panel in accordance with one embodiment of the present disclosure, by having the object detection sensor 700 detect an object under the solar panel unit 300 and generate a warning, it is possible to prevent the occurrence of safety accidents that may occur in the process of adjusting the angle of the solar panel. Furthermore, in the solar boat with an adjustable angle of a solar panel in accordance with one embodiment of the present disclosure, there may also be provided a function of emergently stopping the angle adjustment of the solar panel, in addition to the function of generating a warning when the object detection sensor 700 detects an object under the solar panel unit 300.

As set forth above, the present disclosure has been described with reference to the embodiments shown in the drawings, which are, however, merely illustrative, and it should be understood that various modifications and equivalent other embodiments are possible based on common knowledge in the art to which the present technology pertains. Therefore, the true technical protection scope of the present disclosure is based on the claims to be described below, and should be determined based on the specific contents of the disclosure set forth above.

INDUSTRIAL APPLICABILITY

The present disclosure relates to a solar ship with an adjustable angle of a solar panel, and can be used in industrial fields related to boats that generate electricity and operate using sunlight.

DESCRIPTION OF REFERENCE NUMERALS AND SYMBOLS

100: Cabin unit
200: Boat body
210: First fixing unit
220: Second fixing unit
230: First pole storage
231: First buffer member
240: Second pole storage
241: Second buffer member
250: Third pole storage
251: Third buffer member
260: Fourth pole storage
261: Fourth buffer member
300: Solar panel unit
410: First pole
411: First connector
412: Second connector
420: Second pole
421: Third connector
422: Fourth connector
430: Third pole
431: Fifth connector
432: Sixth connector
433: Seventh connector
440: Fourth pole
441: Eighth connector
442: Ninth connector
443: Tenth connector
510: First adjustment unit
511: Eleventh connector
520: Second adjustment unit
521: Twelfth connector
610: First elastic member
620: Second elastic member
700: Object detection sensor

What is claimed is:

1. A solar boat with an adjustable angle of a solar panel, comprising:
a cabin unit;
a boat body provided below the cabin unit and including a first fixing unit and a second fixing unit;
a solar panel unit provided above the cabin unit and configured to convert solar energy into electrical energy;
a first pole provided with a first connector at an upper end thereof and connected to a front left bottom of the solar panel unit via the first connector, and provided with a second connector at a lower end thereof and connected to the boat body via the second connector;
a second pole provided with a third connector at an upper end thereof and connected to a front right bottom of the solar panel unit via the third connector, and provided with a fourth connector at a lower portion thereof and connected to the boat body via the fourth connector;
a third pole provided with a fifth connector at an upper end thereof and connected to a rear left bottom of the solar panel unit via the fifth connector, provided with a sixth connector at a lower portion thereof and connected to the boat body via the sixth connector, and provided with a seventh connector below the sixth connector and connected to an upper end of a first adjustment unit via the seventh connector;
a fourth pole provided with an eighth connector at an upper end thereof and connected to a rear right bottom of the solar panel unit via the eighth connector, provided with a ninth connector at a lower portion thereof and connected to the boat body via the ninth connector, and provided with a tenth connector below the ninth connector and connected to an upper end of a second adjustment unit via the tenth connector;
the first adjustment unit connected to the seventh connector at an upper end thereof, provided with an eleventh connector at a lower end thereof and connected to the first fixing unit via the eleventh connector, and being adjustable in its length; and
the second adjustment unit connected to the tenth connector at an upper end thereof, provided with a twelfth connector at a lower end thereof and connected to the second fixing unit via the twelfth connector, and being adjustable in its length.

2. The solar boat with the adjustable angle of the solar panel of claim 1, further comprising a first elastic member connecting a lower end of the third pole and the first fixing unit, and a second elastic member connecting a lower end of the fourth pole and the second fixing unit, so that when an angle between the third pole and fourth pole and the horizontal plane decreases, elastic forces act while the first elastic member and the second elastic member extend, to thereby perform a function of mitigating the speed of decrease in the angle between the third pole and fourth pole and the horizontal plane.

3. The solar boat with the adjustable angle of the solar panel of claim 1, wherein the first adjustment unit and the second adjustment unit are configured with a first set of electric cylinders [with attractive forces] that [act] actuate such that [while] the first adjustment unit and the second adjustment unit extend, so that when an angle between the third pole and fourth pole and the horizontal plane decreases, [the attractive forces from] the first set of electric cylinders mitigate the speed of decrease in the angle between the third pole and fourth pole and the horizontal plane.

4. The solar boat with the adjustable angle of the solar panel of claim 3, wherein the boat body further comprises a first pole storage, a second pole storage, a third pole storage, and a fourth pole storage for storing the first pole, the second pole, the third pole, and the fourth pole.

5. The solar boat with the adjustable angle of the solar panel of claim 4, wherein the first pole storage comprise a first buffer member, the second pole storage comprise a second buffer member, the third pole storage comprise a third buffer member, and the fourth pole storage comprise a fourth buffer member, and wherein the first buffer member, the second buffer member, the third buffer member, and the fourth buffer member can mitigate an impact caused at the time of storing the first pole, the second pole, the third pole, and the fourth pole, respectively.

6. The solar boat with the adjustable angle of the solar panel of claim 3, wherein the first pole, the second pole, the third pole, and the fourth pole are configured with a second set of electric cylinders, with a feature of enabling height adjustment of the solar panel unit.

7. The solar boat with the adjustable angle of the solar panel of claim 3, further comprising an object detection sensor configured to generate a warning when an object is detected under the solar panel unit so as to prevent accidents that may occur when adjusting the angle of the solar panel.

* * * * *